US008739394B2

(12) United States Patent
Negron et al.

(10) Patent No.: US 8,739,394 B2
(45) Date of Patent: Jun. 3, 2014

(54) SYSTEM FOR STRINGING A FIRST ELONGATE ELEMENT INTO A SECOND ELONGATE ELEMENT

(75) Inventors: Edgardo Ortiz Negron, Bayamon, PR (US); Victor Torres Serrano, Guaynabo, PR (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 726 days.

(21) Appl. No.: 12/986,867

(22) Filed: Jan. 7, 2011

(65) Prior Publication Data

US 2011/0099800 A1 May 5, 2011

Related U.S. Application Data

(60) Division of application No. 12/025,358, filed on Feb. 4, 2008, now Pat. No. 7,891,086, which is a continuation of application No. 11/172,282, filed on Jun. 30, 2005, now Pat. No. 7,350,291.

(51) Int. Cl.
*B23P 19/00* (2006.01)

(52) U.S. Cl.
USPC ....................... 29/745; 29/759; 254/134.3 FT

(58) Field of Classification Search
USPC ............ 29/745, 759, 828, 33 F; 254/134.3 R, 254/134.3 FT, 134.4; 57/279; 604/143
See application file for complete search history.

(56) References Cited

U.S. PATENT DOCUMENTS

| | | | | |
|---|---|---|---|---|
| 3,034,766 | A | | 5/1962 | Hamrick |
| 4,850,569 | A | | 7/1989 | Griffioen et al. |
| 4,934,662 | A | | 6/1990 | Griffioen et al. |
| 5,019,037 | A | * | 5/1991 | Wang et al. .................. 604/143 |
| 5,118,226 | A | | 6/1992 | Horii et al. |
| 5,374,034 | A | | 12/1994 | Flores et al. |
| 5,813,658 | A | | 9/1998 | Kaminski et al. |
| 6,029,435 | A | * | 2/2000 | Okamoto ....................... 57/279 |
| 6,264,170 | B1 | | 7/2001 | Casella |
| 6,364,290 | B1 | | 4/2002 | Barker |
| 7,350,291 | B2 | | 4/2008 | Negron et al. |
| 7,891,086 | B2 | | 2/2011 | Negron et al. |

* cited by examiner

*Primary Examiner* — Donghai D Nguyen
(74) *Attorney, Agent, or Firm* — Faegre Baker Daniels LLP

(57) ABSTRACT

A method for stringing a first elongate element through a second elongate element is provided by placing the first elongate element in a channel and injecting compressed gas into the channel to propel the first elongate element therethrough. The channel has a first open end, and the second elongate element is sealed around the first open end. Compressed gas is injected into the channel towards the second elongate element, propelling the first elongate element through the second elongate element. Also disclosed is a system for performing such a method, including a source of compressed gas and a housing having a channel with a first end and a second open end. The first end is in fluid communication with the source of compressed gas. The channel has a tapered portion adjacent the open end of the channel, and the channel defines a straight longitudinal axis between the first end and the second open end.

20 Claims, 6 Drawing Sheets

SYSTEM FOR STRINGING A FIRST ELONGATE ELEMENT INTO A SECOND ELONGATE ELEMENT

CROSS-REFERENCES TO RELATED APPLICATION

This application is a divisional of U.S. application Ser. No. 12/025,358, filed Feb. 4, 2008, now U.S. Pat. No. 7,891,086, which is a continuation of U.S. application Ser. No. 11/172,282, filed Jun. 30, 2005, now U.S. Pat. No. 7,350,291, both of which are incorporated herein by reference in their entirety.

TECHNICAL FIELD

The present invention relates to methods for assembling electrical cables. More specifically, the invention relates to devices and methods for stringing electrical cable through a tubular sheath.

BACKGROUND

Drawn brazed strand (DBS) is a type of cable characterized by good strength, stress resistance and conductivity properties that is frequently used in applications where cable failure is highly undesirable. One example is in the field of implantable medical devices, such as pacemakers, where the repair or replacement of electrical cables in the leads would require invasive surgery.

DBS typically includes a conductive element encased in a protective sheath. The conductive element is formed of a number of conductive strands twisted together. Each strand is formed from a plurality of individual alloy wires woven or wrapped about a core wire. The core wire is generally soft but highly conductive, and is usually made of silver, while the alloy wires are less conductive but stronger. The sheath is typically formed of a non-conductive material such as silicone or polyurethane. The sheath increases cable strength and also provides a protective electrical and environmental barrier around the conductive element.

Once the wires are formed into strands and the strands are twisted into the cable, the conductive element is inserted, or stringed, through one end of the sheath. Prior to assembling the conductive element with the sheath, a lubricant such as alcohol is injected into the sheath. The alcohol chemically interacts with the interior silicone wall of the tubing to provide a more lubricious surface. The conductive element is then pushed into and through the tube from one end.

This process has many drawbacks. First, despite lubricating the interior of the sheath, the conductive element has a tendency to become kinked within the sheath. Kinking degrades the conductive properties and strength of the cable such that kinked units are usually discarded. Second, alcohol is highly combustible and emits noxious fumes and odors bothersome to operators. Sometimes it is necessary to provide a venting system to maintain adequate air quality and additional fire control precautions must be employed. Third, residual alcohol must be removed from the stringed cable before further processing can be carried out. This is typically accomplished by placing the stringed cable into a furnace or near some other source of heat to evaporate the alcohol. Finally, the alcohol supply may become contaminated. Contamination can affect the lubricity between the conductive element and the sheath, and may cause particulates to be deposited within the sheath after the alcohol is evaporated.

Therefore, there exists a need for an improved method of stringing cables such as DBS type cable. There is a further need for a method that does not require the use of alcohol.

SUMMARY

In one embodiment, the present invention is a method for manufacturing a cable of the type including a conductive element disposed inside a tubular sheath. The conductive element is placed in an open channel terminating at a first end and is withdrawn through the channel a pre-determined distance from the first end. The channel is closed and a first end of the sheath is sealed to the channel first end. Compressed gas is injected into the channel towards the first end such that the conductive element is propelled through the channel into the sheath.

In another embodiment, the present invention is a method of manufacturing cable of the type having a conductive element and a hollow tubular sheath. The conductive element is inserted into a needle and at least a portion of the needle is inserted into the sheath. The sheath is sealed to the needle. An air bearing is formed on an inner surface of the sheath and the conductive element is propelled through the needle, over the air bearing and into the sheath.

In another embodiment, the present invention is a system for advancing a conductive element through a hollow tubular sheath. The system includes a source of compressed gas, a vacuum pump and an openable housing having a channel extending therethrough. The channel has a first end in fluid communication with the compressed gas and the vacuum pump and a second end that is open. The system also includes a holding area adjacent the first end of the housing. The holding area is sized and shaped to receive at least a portion of a conductive element and in fluid communication with the vacuum pump.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

Figure 1:
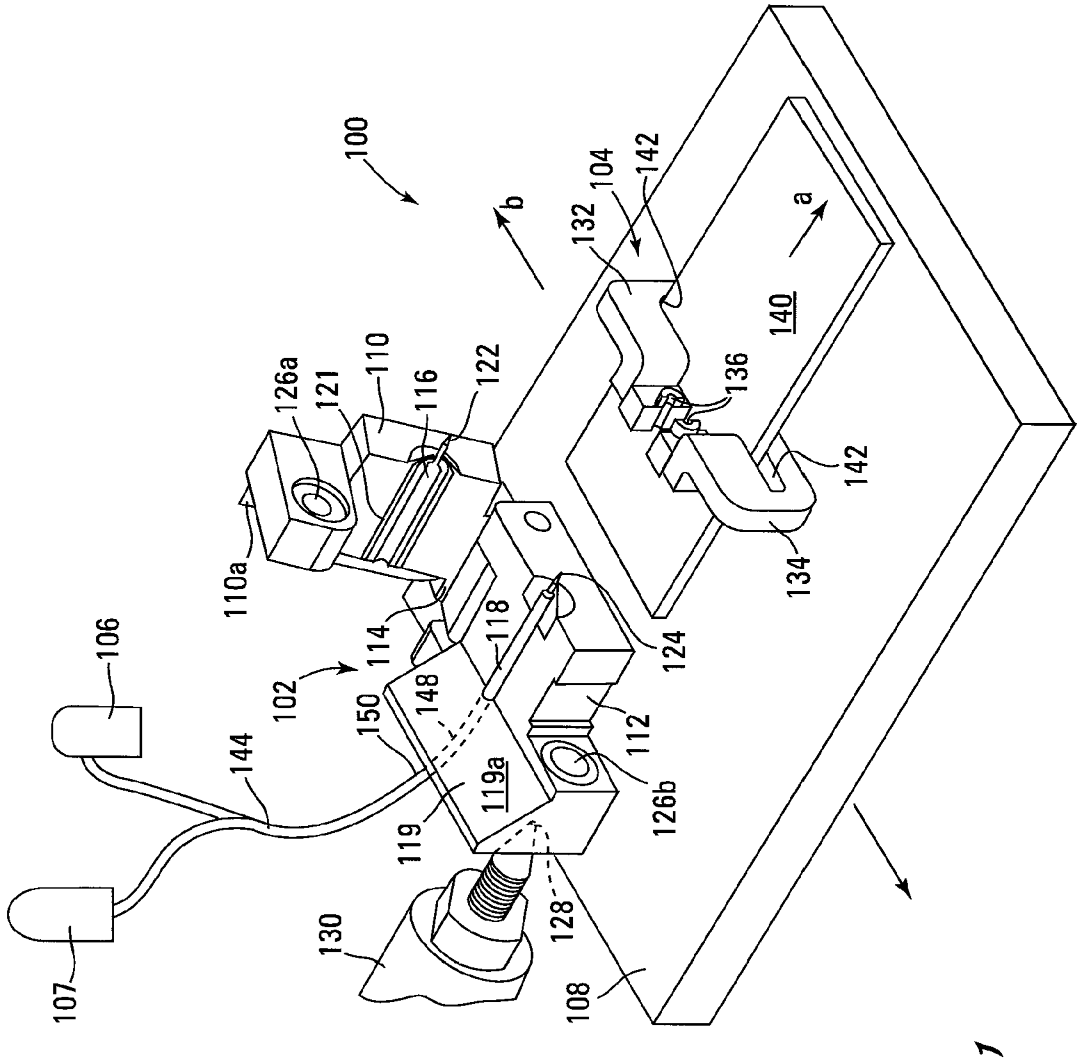
FIG. 1 is a perspective view of a cable stringing system in an open position according to an embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIGS. 1-4 show a cable stringing system 100 for advancing a cable (e.g., a conductive element) through a sheath, in accordance with an embodiment of the present invention, during various stages of system operation. As shown in FIG. 1, the system 100 includes a housing 102 for holding the conductive element (see FIG. 4), a clamp 104 for holding the sheath (see FIG. 4) and a compressed gas source 106. In one embodiment, the system 100 further includes a vacuum pump 107. In one embodiment, the housing 102 and the clamp 104 are positioned on a platform 108 at a convenient height for operator manipulation. The compressed gas 106 and the vacuum pump 107 are located nearby and are in fluid communication with the housing 102. Multiple cable stringing systems 100 may be connected to the compressed gas source 106 and the vacuum pump 107.

Figure 2:
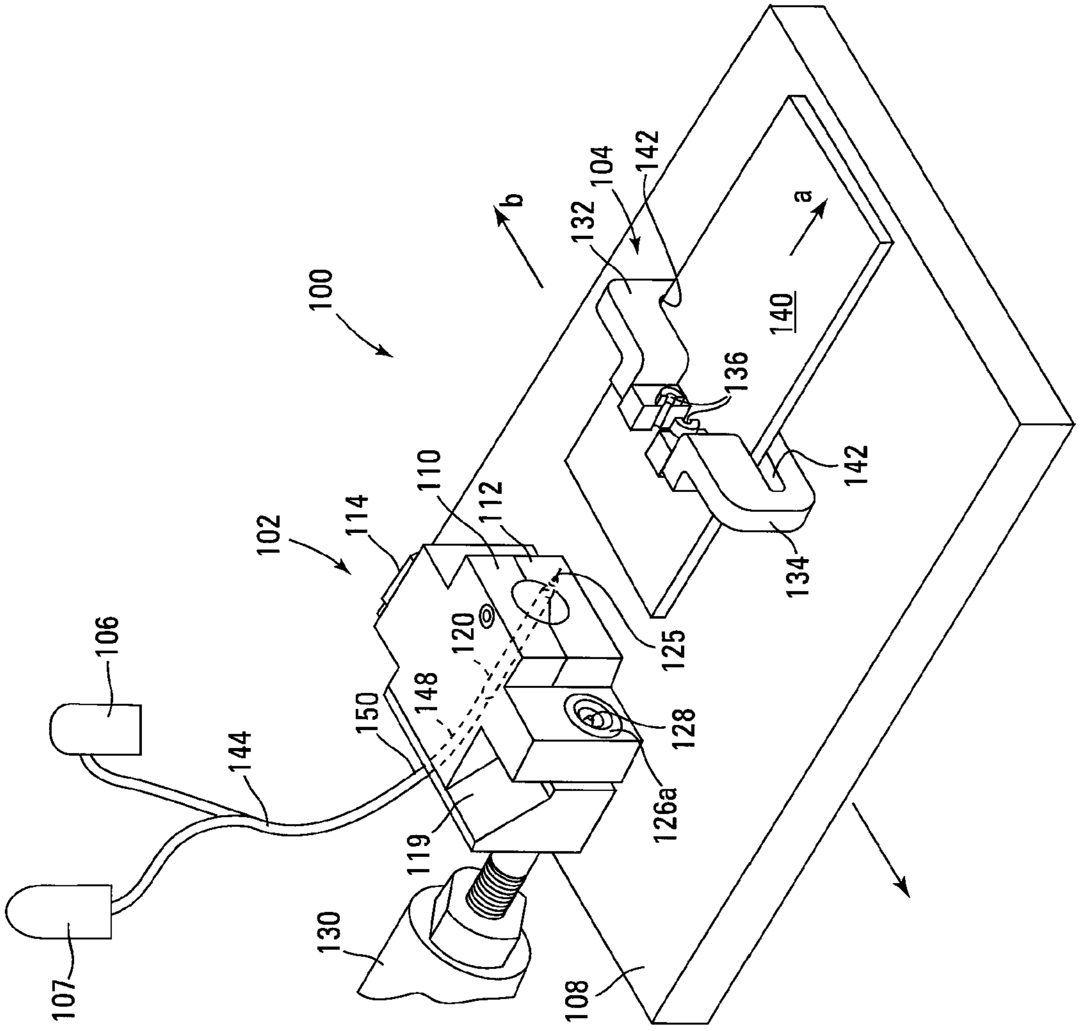
FIG. 2 is a perspective view of the cable stringing system of FIG. 1 in which the housing is in a closed position.

The housing 102 includes an upper housing member 110 pivotally hinged to a stationary lower housing member 112 at a hinge member 114. The upper housing 110 is pivotable from an open position, as is shown in FIG. 1, to a closed position, as is shown in FIG. 2.

Open upper and lower channels 116 and 118 are located on the upper and lower housing members 110 and 112, respectively. The lower channel 118 extends through a rear portion 119 of the lower housing member 112 (shown in dashed lines). In the closed position, the upper open channel 116 is aligned to the lower channel 118 to define a conductive element channel 120 extending through the housing 102 (See FIG. 2 in dashed lines). A resilient seal member 121 is disposed alongside the upper channel 116 to seal the upper channel 116 to the lower channel 118 when the upper housing member 110 is in the closed position. The rear portion 119 of the lower housing member 112 has an angled upper surface **119*a* that is complementary to a lower surface 110*a* of the upper housing member 110. When the upper housing member 110 is in the closed position, the surface 119*a* and 110*a* abut one another to seal the upper and lower channel 116 and 118 adjacent the rear portion 119**.

Both of the upper and lower channels 116 and 118 taper into upper and lower needle portions 122 and 124, respectively. The upper and lower needle portions 122 and 124 form a hollow needle 125 protruding from the housing 102 when the upper housing member 110 is in the closed position. Each of the needle portions 122 and 124 forms approximately half of the circumference of the needle 125. However, the upper needle portion 122 and lower needle portion 124 are slightly oversized such that when the upper housing member 110 is in the closed position, the upper needle portion 122 presses tightly against the lower needle portion 124 to form an air tight seal.

Figure 3:
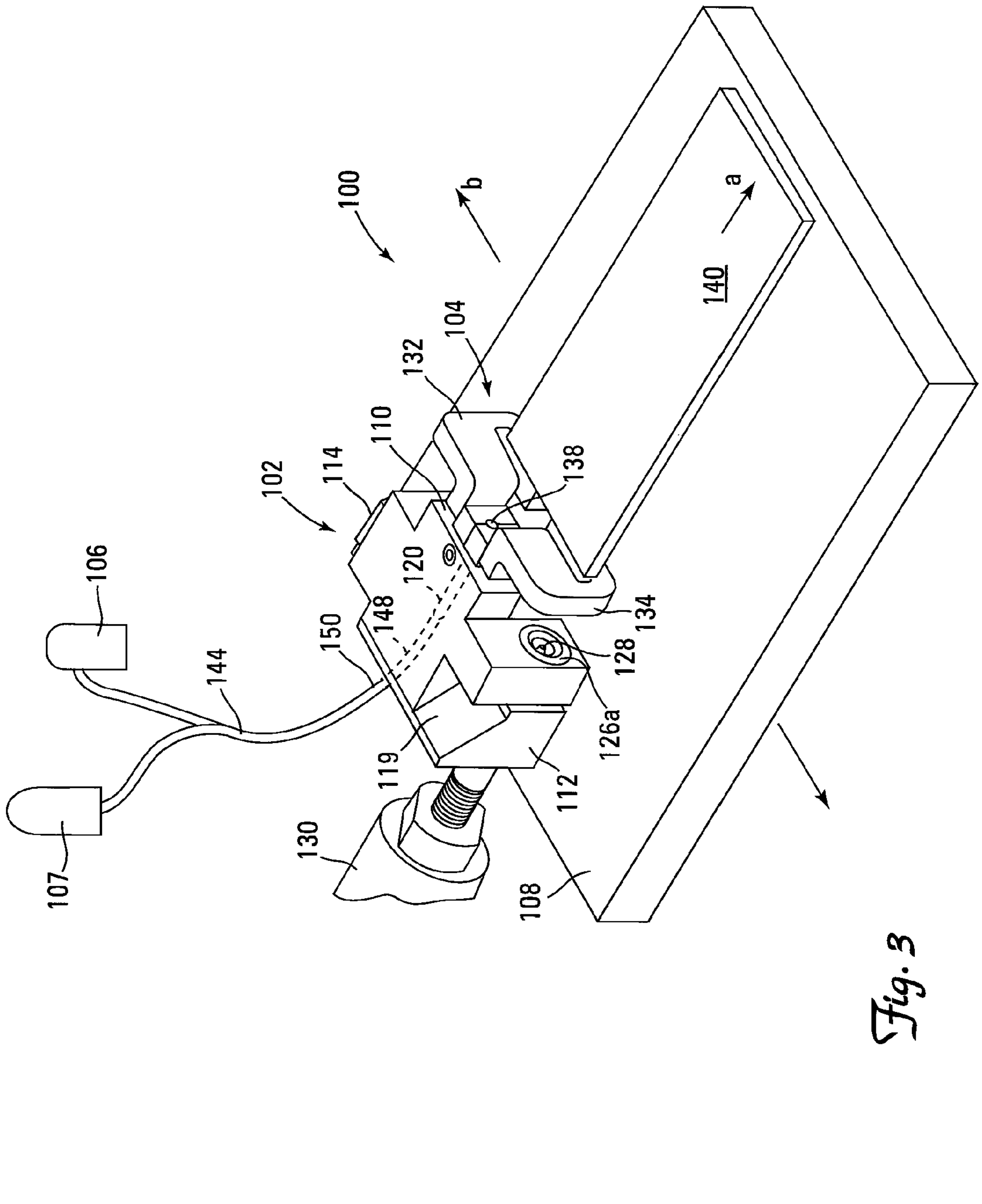
FIG. 3 is a perspective view of the system of FIG. 2 in which the clamp is in the operating position.

The upper and lower housing members 110 and 112 include locking pin receivers **126*a* and 126*b*, respectively, that are aligned to one another when the upper housing member 110 is in the closed position. The rearwardly located locking pin receiver 126*b* is slightly larger than the forwardly located locking pin receiver 126*a*. A locking pin 128 is insertable into the aligned locking pin receivers 126*a* and 126*b* to lock the upper housing member 110 to the lower housing member 112 in the closed position (See FIG. 2). The locking pin 128 is cone-shaped and is sized relative to the locking pin receivers 126*a* and 126*b* to compress the upper housing member 110 and the lower housing member 112 together when engaged. The force exerted by the locking pin 128 is sufficient to cause the seal 121 around the channel 120 to be air tight, as well as to compress the upper and lower needle portions 122, 124 sufficiently to form an air tight seal. In one embodiment, as is shown in FIGS. 1-3, the locking pin 128 is engaged via a pneumatic actuator 130. Other locking arrangements suitable for quickly and easily securing the upper housing member 110 to the lower housing member 112** are also contemplated.

The clamp 104, shown in the lower, right quadrant of FIGS. 1-3, is bifurcated into two members 132 and 134. The clamp members 132 and 134 are movable from a separated, open position, as is shown in FIGS. 1 and 2, to a closed position in which the clamp members 132, 134 are drawn inwardly adjacent one another, as is shown in FIG. 3. Each clamp member 132, 134 includes an inwardly facing, elongated, semi-hemispherical recess 136, which are adapted to couple to the sheath (see FIG. 4).

A locking arrangement is provided for locking the clamp members 132, 134 to one another in the closed position and for fixing the clamp 104 in the operating position. The clamp members 132, 134 are also movable from a retracted position that is spaced apart from the housing 102, as is shown in FIG. 1, to an advanced, operating position adjacent the housing 102, as is shown in FIG. 3.

In the closed position, the recesses 136 are aligned with one another to define a tubular passageway 138 for receiving a portion of the sheath 160. The recesses 136, in one embodiment, are sized such that a circumference of the passageway 138 is only slightly larger than a circumference of the needle 125 when the clamp members 132, 134 are moved into the closed position. The recesses 136 may have a length or depth of several centimeters to increase the surface area and frictional engagement between the sheath 160 and the clamp 104. Furthermore, the clamp 104 may be provided with a non-skid coating or be formed with a surface texture at the recesses 136 that is adapted to increase frictional engagement between the sheath (see FIG. 4) and the clamp 104. In the operating position, the clamp 104 is positioned such that the needle 125 is inserted into the passageway 138.

In one embodiment, a guide 140 extends in a lateral direction over the platform 108 for accommodating opening and closing movement of the clamp 104 and for guiding the clamp 104 towards the housing 102. The clamp portions 132, 134 are movably coupled to the guide 140 and each clamp portion 132, 134 includes a guide recess 142 for capturing the guide 140. In other embodiments, the platform 108 may include rails, tracks, grooves, rollers or other means for guiding the movement of the clamp members 132, 134 between the retracted and operating positions and between the open and closed positions. In still other embodiments, the clamp 104 is movably suspended above the housing 102.

In the present embodiment, the retracted position of the clamp 104 is spaced apart from the housing 102 along a longitudinal axis a aligned with the channel 120 and parallel to the plane of the platform 108. However, in other embodiments the clamp 104 is movable along other axes or even within other planes. For example, in other embodiments, the clamp 104 is lowered from a position above the housing 102 into the operating position. Likewise, in the present embodiment, the clamp members 132 and 134 are movable along an axis b perpendicular to the axis a within the plane of the platform 108 between the open position and the closed position. In other embodiments, however, the clamp members 132, 134 are movable from the open position to the closed position along other axes or even within other planes. For example, in other embodiments, the clamp portions 132 and 134 are raised and lowered between the open and closed positions. Furthermore, while in the present embodiment both of the clamp members 132, 134 move approximately equal distances from their respective open positions to the closed position, as is shown in FIGS. 1-3, in other embodiments one of the clamp members 132, 134 moves from an open position to a closed position while the other is stationary, or their relative movements are otherwise unequal.

Movement of the housing 102 and clamp 104 into respective closed positions and into the operating position may be automated, manual, or power-assisted, or any combination thereof.

The compressed air 106 and vacuum pump 107 are both in fluid communication with the housing 102 via a fluid or gas line 144. The gas line 144, in one embodiment, is detachably couplable to the housing 102 via a quick-connect adaptor 146. The adaptor 146 is positioned at a rearward end 148 of the lower channel 118. The adaptor 146 is preferably configured to both direct compressed air 106 and draw a vacuum via the vacuum pump 107 parallel to or in line with the longitudinal axis a of the channel 120. As is shown in FIGS. 1-3, a portion 150 of the gas line 144 immediately adjacent the housing 102 is straight or slightly arcuate. In one embodiment, the portion 150 of the gas line 144 has a length of up to about 40 inches. In another embodiment, the portion 150 of the gas line 144 has a length of about the length of the conductive element 164. The portion 150 of the gas line 144 serves as a holding area for holding all or a portion of the conductive element 164 without deforming the conductive element 164.

The system 100 further includes a sensor 152 operationally coupled to the vacuum pump 107. The sensor 152 is located in the rearward end 148 of the lower channel 118 within the lower housing member 112. The sensor 152 is configured to sense the presence of the conductive element 164 when loaded into the lower channel 118. The sensor 152 provides a signal to either or both of the vacuum pump 107 and compressed gas source 106 indicating the presence or absence of the conductive element 164 in the lower channel 118 and may further provide a signal indicating the position of the conductive element 164 relative to a reference features, such as an end of the channel 120, the needle 125 or the adaptor 146. This signal may be used to control at least a part of the operation of either or both of the vacuum pump 107 and compressed gas source 106.

Figure 4:
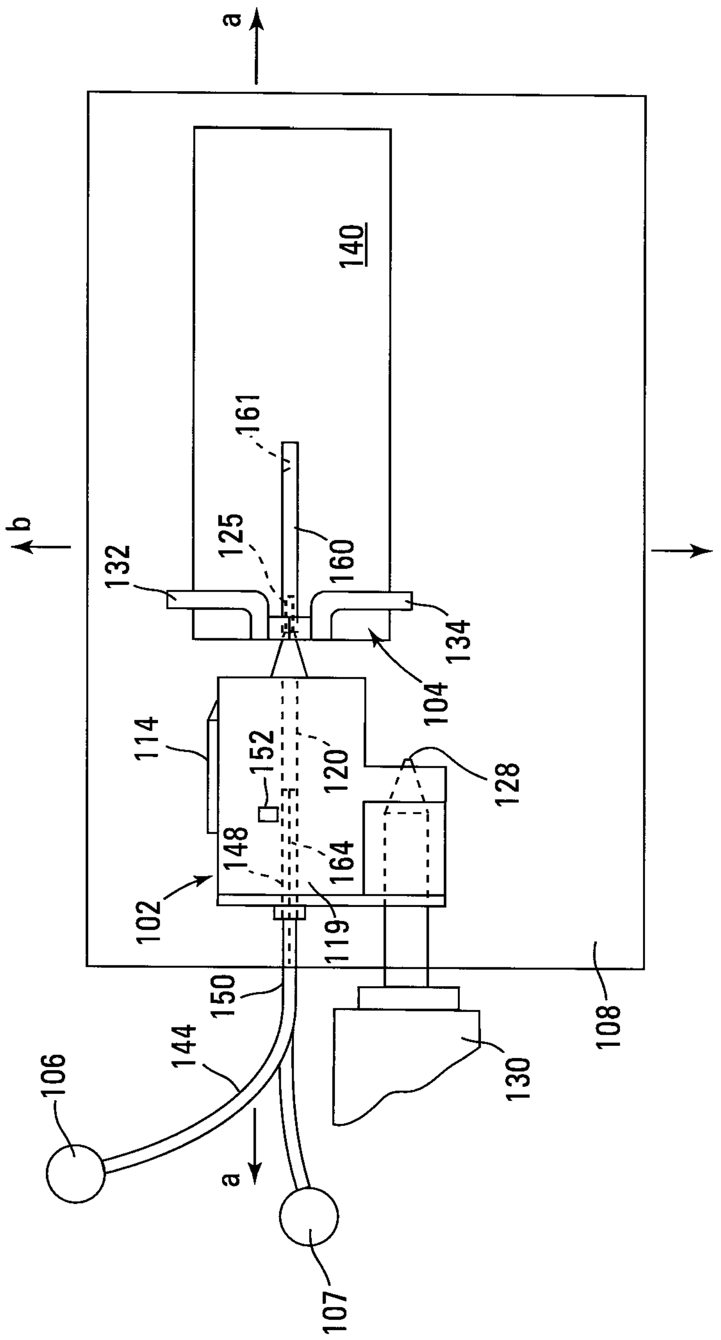
FIG. 4 is a top view of the system of FIG. 3 loaded with a sheath and conductive element.

FIG. 4 shows the system 100 in an intended operating position. As shown in FIG. 4, a tubular sheath 160 is coupled to the clamp 104 between the clamp members 132 and 134, and a cable or conductive element 164 is pre-loaded into the gas line 144. As further shown, a distal end of the sheath 160 is positioned against the housing 102 and over the tip of the needle 125.

Figure 5:
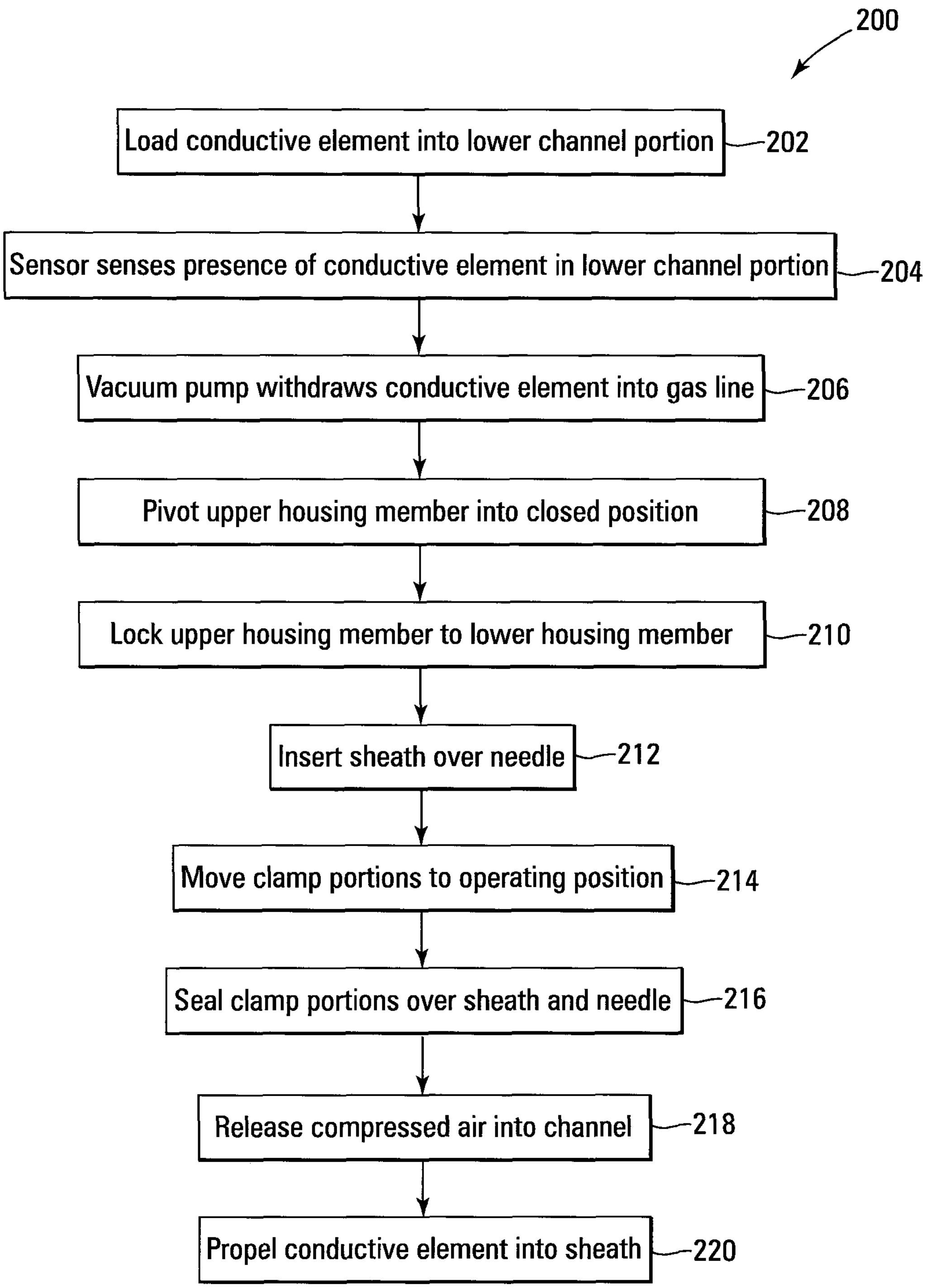
FIG. 5 shows a flowchart detailing a method of assembling the cable according to an embodiment of the present invention.

FIG. 5 is a flowchart illustrating a method 200 of stringing or inserting the conductive element 164 through the tubular sheath 160 with the system 100, according to one embodiment of the present invention. A first end of the conductive element 164 is placed in the lower channel 118 and inserted into the rearward end 148 of the lower channel 118 (block 202). The sensor 152 senses that the conductive element 164 is in the lower channel 118 and communicates with the vacuum pump 107 (block 204). In one exemplary embodiment, upon receiving input from the sensor 152 that the conductive element 164 is loaded into the lower channel 118, the vacuum pump 107 exerts negative pressure sufficient to withdraw the conductive element 164 from the housing 102 into the portion 150 of the gas line 144 immediately adjacent the housing 102 (block 206).

The strength and duration of the vacuum exerted by the vacuum pump 107 is preferably pre-determined or calculated to bring the conductive element 164 to a particular position within the gas line 144 relative to a reference feature, such as the needle 125. In this manner, regardless of the length of the conductive element 164, or how far the operator manually inserts the conductive element 164 into the lower channel portion 118, the conductive element 164 is moved into a consistent position relative to the needle 125 for stringing into the sheath 160. In one embodiment, the vacuum pump 107 operates until the sensor 152 indicates that the conductive element 164 is no longer positioned in the channel portion 118.

In other embodiments, the vacuum pump 107 is not included. Rather, either the operator is responsible for consistently positioning the conductive element 164 within housing 102 or the system 100 is provided with additional sensors to determine when the conductive element 164 is fully stringed through the sheath 160.

The upper housing member 110 is pivoted downward into the closed position (block 208) and secured with the locking pin 128 and locking pin receivers 126*a* and 126*b*, forming the sealed channel 120 (block 210). To load the sheath 160 into the clamp 104, the operator manually places an end 158 of the sheath 160 over the needle 125 (block 212) and brings the clamp portions 132, 134 forward to the operating position on either side of the needle 125 (block 214). The first and second portions 138 and 140 are moved into the closed position to clamp the sheath 160 into position over the needle 125, as is shown in FIG. 4 (block 216). As stated above, the passageway 138 is only slightly larger than the needle 125 to facilitate forming a seal over the needle 125.

After the conductive element 164 and the sheath 160 have been loaded into the housing 102 and clamp 104, the compressed air 106 is released or injected into the channel 120 (block 218), propelling the conductive element 164 through the needle 125 and into the sheath 160 (block 220). The force at which the compressed air 106 is released as well as the duration is calculated to advance the conductive element 164 a pre-determined distance into the sheath 160. Typically, the conductive element 164 is stringed all the way through to an opposite end of the sheath 160. According to one embodiment, the system 100 is configured to string a conductive element 164 having a length of up to about 40 inches through a sheath 160 having a length of up to about 40 inches. In other embodiments, the system 100 is configured to string longer or shorter lengths of conductive element 164 and sheath 160.

It may be necessary to adjust the position of the conductive element 164 with respect to the sheath 160 the initial stringing process described above. More compressed air 106 may be injected into the sheath 160 to "nudge" the conductive element 164 forward. Once the conductive element 164 is in a satisfactory position within the sheath 160, the compressed air 106 is de-activated and the clamp portions 132 and 134 are opened, releasing the assembled sheath 160 and conductive element 164. Alternately, so as to withdraw or back out the conductive element 164 from the sheath 160, the partially stringed sheath 160 and conductive element 164 are released from the clamp portions 132 and 134 a re-assembled or reloaded into the tool 100 in the reverse direction. The opposite end of the sheath 160 is inserted over the needle 125 and the compressed air 106 is activated to propel the conductive element 164 in the opposite direction in as the initial stringing process.

The above-described process may be partially automated, in which the operator merely loads the conductive element 164 into the lower channel 118 and places the sheath 160 over the needle 120 as described. Alternately, the operator can also be responsible for opening and closing the housing 102 and clamp 104 and for engaging the various locking mechanisms. The amount of the time the compressed gas 106 and vacuum pump 107 are activated may be automated or subject to the controls of additional sensors, or may be engaged and disengaged under operator control. Various additional safety features can also be employed to prevent injury to the operator. For example, sensors may be employed to allow the compressed air 106 to engage only when either or both of the housing 102 and clamp 104 are in closed positions.

The force exerted by the compressed gas 106 traveling through the sheath 160 radially expands the sheath 160, increasing the ease with which the conductive element 164 is propelled through the sheath 160. However, injection pressure in excess of about 110 psi may cause the sheath to over-expand and rupture. Generally, the mechanical properties and characteristics of the sheath 160 material will determine the maximum injection pressure and the minimum injection pressure necessary to sufficiently radially expand the sheath 160. For example, if the sheath 160 is constructed of a more rigid material, such as polyurethane, a higher injection pressure may be necessary to expand the sheath 160 to a chosen radius. Furthermore, the differential between the inner diameter of the sheath and the outer diameter of the conductive element will also impact the pressure necessary to string the conductive element.

The compressed gas 106 is preferably released or injected into the channel 120 at a pressure of from about 90 to about 110 psi. Peripheral fixtures, such as the gas line 144, adaptor 146 and other such features between the compressed gas 106 and the channel 120 reduce the actual injection pressure. Therefore, the compressed gas 106 is maintained at a sufficiently elevated pressure to achieve the necessary actual injection pressure. Alternately, a pressure booster as is known in the art may be employed with a lower pressure compressed gas 106 to increase the actual injection pressure to adequate levels (not shown). According to one embodiment, the source of compressed gas 106 is maintained under a pressure of about 60 psi and is employed in conjunction with a pressure booster to approximately double the pressure of the compressed gas 106 to 120 psi.

The following is merely one example of system settings for stringing a conductive element through a sheath. For a conductive element having a diameter of approximately 0.200"+/−0.0015" and a length of approximately 40" and a sheath having an interior diameter of approximately 0.022"+/−0.001" and a wall thickness of approximately 0.008"+/−0.001", approximately 106 to approximately 120 psi of compressed air is applied for 3 to 10 seconds to fully string the conductive element.

In one embodiment, the compressed gas 106 is injected into the channel 120 in pulses. The pulses serve to increase the propellant force and reduce the likelihood of the conductive element 164 becoming kinked within the sheath 160. However, the compressed gas 106 may be injected into the channel 120 in any other pattern or at a constant rate of flow. Pulsing or other variations in injection of the compressed gas 106 may be automated or may be accomplished by manually engaging and disengaging the compressed gas 106.

The gas flow creates an air bearing between the interior of the sheath 160 and the conductive element 164. The air bearing serves to reduce friction between an inner surface 161 of the sheath 160 and the conductive element 164, further facilitating the insertion of the conductive element 164 through the sheath 160 (See FIG. 4).

Any type of gas may be employed to propel the conductive element 164 through the sheath 160. According to one embodiment, either of air or nitrogen is employed. Both air and nitrogen are inexpensive, commonly available gases relatively safe for use under pressure.

Figure 6:
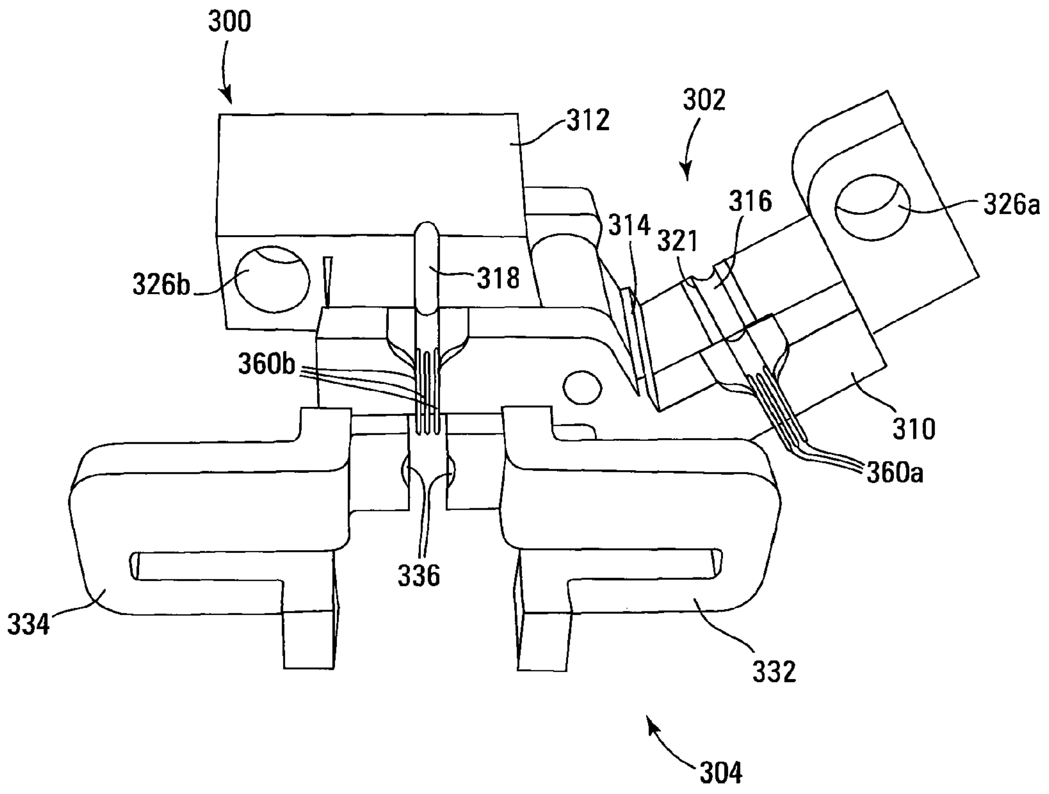
FIG. 6 is a detailed view of a portion of a cable stringing system in accordance with another embodiment of the present invention.

FIG. 6 shows a portion of a device 300 according to another embodiment of the present invention. The device 300 includes a housing 302 and a clamp 304 similar to the embodiment shown generally in FIGS. 1-3, and like parts are given like numbering. According to the present embodiment, however, a plurality of upper and lower needle portions 360*a* and 360*b* extend from the upper and lower channels 316 and 318, respectively. When the upper housing member 310 is in the closed position, the upper and lower needle portions 316, 318 form a plurality of needles arranged for insertion into a sheath 160 divided into multiple inner lumens. According to various embodiments, the device 300 includes 2, 3 or 4 sets of needle portions 316, 318 for stringing 2, 3 or 4 lumens within a single sheath 160 simultaneously.

In order to ensure that each conductive element advances through separate needles, the conductive elements are not fully withdrawn into the gas line. Rather, a forward end of the conductive elements is positioned in the needle and the upper housing is closed. The pre-loaded conductive element is then stringed through the individual lumens of the sheath.

In the embodiment of FIG. 6, the needle portions 316, 318 are permanently affixed to the housing 302. In other embodiments, however, all or some of the needle portions 316, 318 are detachable from the housing 102 individually or as a unit. This allows interchangeability of variously arranged needle units, increasing the versatility of device 300.

While the present invention is described generally in terms of manufacturing DBS cable, the methods and devices of the present invention are suitable for any number of applications. For example, the present invention may be used, but is not limited, for stringing non-DBS cables, coil cables, stylets and plastic beats.

Various modifications and additions can be made to the exemplary embodiments discussed without departing from the scope of the present invention. Accordingly, the scope of the present invention is intended to embrace all such alternatives, modifications, and variations as fall within the scope of the claims, together with all equivalents thereof.

We claim:

1. A system for stringing a first elongate element through a hollow tubular member, the system comprising:

a source of compressed gas;

a housing having a channel extending therethrough, the channel having a first end in fluid communication with the source of compressed gas and a second open end;

the channel having a tapered portion adjacent the open end of the channel in which the cross-sectional area of the channel tapers toward the open end;

a first moveable clamp member and a second moveable clamp member, the first and second moveable clamp members configured to hold an end of the hollow tubular member adjacent the second open end of the channel;

wherein the channel defines a straight longitudinal axis between the first end and the second open end.

2. The system of claim 1, further comprising a source of vacuum.

3. The system of claim 2, wherein the first end of the channel is in fluid communication with the source of vacuum.

4. The system of claim 1, wherein the first and second moveable clamp members are configured to hold the hollow tubular member in alignment with the axis of the channel.

5. The system of claim 1, wherein an inner cross-sectional area of the tapered portion tapers toward the open end.

6. The system of claim 1, wherein an outer cross-sectional area of the tapered portion tapers toward the open end.

7. The system of claim 6, wherein the first and second moveable clamp members are configured for holding an end of the hollow tubular member against the outer surface of the tapered portion of the channel.

8. The system of claim 1, wherein both the inner and outer cross-sectional areas of the tapered portion taper toward the open end.

9. A system for stringing a first elongate element through a hollow tubular member, the system comprising:
- a source of compressed gas;
- a source of vacuum;
- a gas line in fluid communication with the source of compressed gas and the source of vacuum;
- a housing having a channel extending therethrough, the channel having a first end in fluid communication with the gas line and a second open end;
- the channel having a tapered portion adjacent the open end of the channel in which the cross-sectional area of the channel tapers toward the open end; and
- the channel defining a straight longitudinal axis between the first end and the second open end.

10. The system of claim 9, further comprising a mechanism for holding an end of the hollow tubular member adjacent the second open end of the channel.

11. The system of claim 10, wherein the mechanism for holding an end of the hollow tubular member is configured to hold the hollow tubular member in alignment with the axis of the channel.

12. The system of claim 9, wherein an inner cross-sectional area of the tapered portion tapers toward the open end.

13. The system of claim 9, wherein an outer cross-sectional area of the tapered portion tapers toward the open end.

14. The system of claim 13, further comprising a mechanism for holding an end of the hollow tubular member against the outer surface of the tapered portion of the channel.

15. The system of claim 9, wherein both the inner and outer cross-sectional areas of the tapered portion taper toward the open end.

16. A system for stringing a first elongate element through a hollow tubular member, the system comprising:
- a source of compressed gas;
- a source of vacuum;
- a housing having a channel extending therethrough, the channel having a first end in fluid communication with the source of compressed gas and with the source of vacuum, the channel having a second open end;
- the channel having a tapered portion adjacent the open end of the channel in which the cross-sectional area of the channel tapers toward the open end; and
- the channel defining a straight longitudinal axis between the first end and the second open end.

17. The system of claim 16, wherein an inner cross-sectional area of the tapered portion tapers toward the open end.

18. The system of claim 16, wherein both the inner and outer cross-sectional areas of the tapered portion taper toward the open end.

19. The system of claim 16, further comprising a mechanism for holding an end of the hollow tubular member, the mechanism configured to hold the hollow tubular member in alignment with the axis of the channel.

20. The system of claim 19, wherein the mechanism for holding an end of the hollow tubular member is configured for holding an end of the hollow tubular member against the outer surface of the tapered portion of the channel.

* * * * *